(12) United States Patent
Cohen

(10) Patent No.: US 10,099,117 B2
(45) Date of Patent: Oct. 16, 2018

(54) DEVICE AND METHOD FOR SENSING MAGNETIZED OBJECTS FOR AN ELECTRONIC TAG GAME

(71) Applicant: Magnetag LLC, Milwaukee, WI (US)

(72) Inventor: Adam I. Cohen, Milwaukee, WI (US)

(73) Assignee: Magnetag LLC, Milwaukee, WI (US)

( * ) Notice: Subject to any disclaimer, the term of this patent is extended or adjusted under 35 U.S.C. 154(b) by 0 days.

(21) Appl. No.: 15/231,429

(22) Filed: Aug. 8, 2016

(65) Prior Publication Data

US 2017/0007919 A1 Jan. 12, 2017

Related U.S. Application Data

(63) Continuation-in-part of application No. 14/086,223, filed on Nov. 21, 2013.
(Continued)

(51) Int. Cl.
*A63F 13/21* (2014.01)
*A63F 13/235* (2014.01)
(Continued)

(52) U.S. Cl.
CPC .............. *A63F 13/21* (2014.09); *A63B 71/02* (2013.01); *A63F 13/212* (2014.09); *A63F 13/214* (2014.09); *A63F 13/235* (2014.09); *A63F 13/327* (2014.09); *A63F 13/92* (2014.09); *A63F 13/816* (2014.09)

(58) Field of Classification Search
CPC ........ A63F 13/00; A63F 13/92; A63F 13/212; A63F 13/214; A63F 13/327; A63B 69/02; A63B 69/004; A63B 71/06; A63B 71/0605; A63B 2024/004; A63B 2220/00;
(Continued)

(56) References Cited

U.S. PATENT DOCUMENTS 5,342,042 A * 8/1994 Candy ................ A63B 71/0605
  473/467
5,863,255 A * 1/1999 Mack ................ A63B 24/0021
  473/151
(Continued)

FOREIGN PATENT DOCUMENTS

WO 2001045814 6/2001
WO 2003067175 8/2003
(Continued)

*Primary Examiner* — Jasson Yoo
(74) *Attorney, Agent, or Firm* — Boyle Fredrickson S.C.

(57) ABSTRACT

An electronic tag game includes a system having magnetic field sensors that are to be worn by a player of the electronic tag game. The magnetic field sensors are configured to detect a change in the local magnetic field. The magnetic field sensors may be in operable communication with one another and are configured to send a signal reporting a change in the local magnetic field to a controller which may be communication with electronic device such as a smart phone or the like. The local magnetic field may be altered by one or more devices configured for creating a change in the local magnetic field. For example a spherical projectile or hand-held object may be provided and include a magnet that is configured to alter the magnetic field around the magnetic field sensors when a player wearing the magnetic field sensor is struck with the projectile.

20 Claims, 7 Drawing Sheets

Related U.S. Application Data

(60) Provisional application No. 61/804,177, filed on Mar. 21, 2013.

(51) Int. Cl.
*A63B 71/02* (2006.01)
*A63F 13/92* (2014.01)
*A63F 13/327* (2014.01)
*A63F 13/212* (2014.01)
*A63F 13/214* (2014.01)
*A63F 13/816* (2014.01)

(58) Field of Classification Search
CPC ............ A63B 2220/10; A63B 2220/80; A63B 2220/836; A63B 2220/89; A63B 71/02
See application file for complete search history.

(56) References Cited

U.S. PATENT DOCUMENTS

| | | | |
|---|---|---|---|
| 6,530,841 B2 | 3/2003 | Bull et al. | |
| 6,878,870 B2 | 4/2005 | Aldridge | |
| 6,925,851 B2 * | 8/2005 | Reinbold | A63B 69/32 |
| | | | 73/12.09 |
| 7,338,375 B1 | 3/2008 | Small | |
| 7,632,187 B1 | 12/2009 | Farley et al. | |
| 7,846,028 B2 | 12/2010 | Small et al. | |
| 7,891,231 B2 | 2/2011 | Song | |
| 8,303,421 B1 | 11/2012 | Farley et al. | |
| 8,469,824 B1 | 6/2013 | Farley et al. | |
| 2002/0037759 A1 * | 3/2002 | Aldridge | A63B 69/004 |
| | | | 463/1 |
| 2003/0217582 A1 | 11/2003 | Reinbold et al. | |
| 2005/0250625 A1 | 11/2005 | Reinbold | |
| 2006/0287114 A1 | 12/2006 | Luong | |
| 2009/0131173 A1 | 5/2009 | Gurnsey | |
| 2009/0235761 A1 | 9/2009 | Song | |
| 2011/0251802 A1 * | 10/2011 | Song | A63B 69/004 |
| | | | 702/41 |
| 2013/0345839 A1 | 12/2013 | Stephens et al. | |

FOREIGN PATENT DOCUMENTS

| | | |
|---|---|---|
| WO | 2005011827 | 2/2005 |
| WO | 2006133063 | 3/2007 |
| WO | 2011154834 | 12/2011 |
| WO | 2013004900 | 1/2013 |
| WO | 2013049901 | 4/2013 |

* cited by examiner

DEVICE AND METHOD FOR SENSING MAGNETIZED OBJECTS FOR AN ELECTRONIC TAG GAME

CROSS REFERENCE TO RELATED APPLICATIONS

This application is a continuation-in-part of U.S. application Ser. No. 14/086,223, filed Nov. 21, 2013, which in turn claims the benefit of priority on U.S. Provisional Patent Application Ser. No. 61/804,177, filed on Mar. 21, 2013 and entitled "Device and Method for Sensing Magnetized Objects for an Electronic Tag Game," the entirety of which is hereby incorporated by reference.

BACKGROUND OF THE INVENTION

1. Field of the Invention

The invention generally relates to electronic tag games and more particularly to a system and method for carrying out an electronic tag game.

2. Discussion of the Related Art

Electronic and other types of tag games have existed for a number of years. For example, games such as laser tag have experienced substantial popularity and involve the use of an optical signal transmitted by a device or weapon and received by sensors worn by an opponent. The receipt of the transmission may then be recorded electronically to signify that the opponent has been hit or tagged by the transmitting party.

Another type of tag game known in the art is paintball. In paintball, opponents fire paint-filled projectiles at one another. Once a player is hit, the projectile leaves behind a paint spot signifying that the player has been "damaged" or eliminated from the competition.

Such tag games suffer from a number of known disadvantages. Paintball, and other projectile based games, do not provide unambiguous evidence that a player has been tagged. It is often up to the participants themselves to score the game with honesty or integrity; such a limitation often requires the game to be refereed by an official. In addition, paintballs are inherently massive, causing significant discomfort to the players on impact. Paintballs leave behind spots of paint, which may be unpleasant and aesthetically unpleasing, and require that the games be played in areas where such paint spatter is acceptable, thus reducing the number of available places for gameplay, and increasing the effort for cleanup. Further, paintball requires the purchase of disposable ammunition, which can make repeated play expensive and even cost-prohibitive. Projectile based tag games, such as paintball, lack many of the advantages of electronic type games like laser tag. The inability to track scoring automatically and communicate digitally between players limits available gameplay options. By employing electronics, new dimensions of interaction are available to the players such as automatic scoring, more diverse gameplay options, interactions with the gaming environment, and instant communication of player status to other players in the game.

Existing electronic tag games lack a projectile or other object configured to hit the players. This is disadvantageous as it affects the realism associated with such games that is often desired by the players. In addition, existing electronic tag games are not able to simulate combat with hand to hand weapons such as swords and shields, limiting the types of gameplay that can be employed on those systems. Another limitation of electronic tag games, such as laser tag, is the inability to localize the point of impact on the player. The sensing system is unable to differentiate, for example, a tag on the abdomen and a tag on the chest due to the spread of the laser beam and limited number of sensors worn by the player. Knowing such information enables more accurate and realistic combat simulation.

The need therefore exists to provide an electronic tag game that overcomes one or more of the foregoing disadvantages.

SUMMARY OF THE INVENTION

In accordance with a first aspect of the invention, an electronic tag game according to the present invention comprises a system including one or more magnetic field sensors, which may be in the form of wire coils, Hall Effect sensors, reed switches, or the like. The magnetic field sensors are configured to be worn by the players of the electronic tag game. For example, the sensors may be coupled to a support apparatus such as a wearable suit or may be provided as patches, straps, belts, gloves, or other such items configured to be coupled with a player's body during gameplay. The sensors may be configured to be operably networked with one another such that a change in the local magnetic field of one of the sensors affects the output of the other magnetic sensors networked therewith. The local magnetic field around the sensors may be changed by one or more projectiles or other objects, including, for example, a rare earth magnet disposed therein or provided thereon, or the inducement of a magnetic field by the movement of electric charge. The sensors are in communication with a controller, such as a microcontroller or integrated circuit, which monitors signals from the sensors. When the local magnetic field is changed by the striking of one of the sensors with a projectile or similar device, a signal is communicated to the microcontroller, which executes a computer program and may be configured to provide an indication of such a change in the local magnetic field by sounding an audible alarm, vibrating an element coupled to the player, or illuminating a lighting element such as an LED or the like.

In one construction of the system of the present invention, an electronic device such as, for example, a smart phone, may be incorporated into the system. For instance, the smart phone may be worn by the players and configured to communicate with the microcontroller to provide the player with real-time gameplay information. For example, the electronic device may have a graphical user interface that provides the player with information relating to his or her relatives "health" status relating to the gameplay or that of other players on his or her team. The graphical user interface of the electronic device may also indicate which players have been eliminated from competition and may alternatively provide information about the opposition's players as desired. Any number of alternative data may be provided by the electronic device.

In at least one construction of the present invention, the local magnetic field of the magnetic field sensors may be altered by one or more different types of projectiles. For instance, projectiles such as polymer covered spheres and darts may be utilized and include rare earth magnets and close within the polymer covering and may be configured to alter the magnetic field of the magnetic field sensors when coming into contact therewith. In yet another construction of the present invention, the device may be in the form of a hand-held simulated weapon such as a sword or the like. The sword may include a handle graspable by the user and may incorporate a blade that is relatively durable yet soft and configured with one or more magnets along a length thereof. In the same manner in which the projectiles may alter the magnetic field of the sensors, the sword may do the same. Alternatively, such an instrument may incorporate a device designed to emit an electromagnetic signal which can activate the magnetic field sensor.

The present invention also contemplates a method of playing electronic tag game. The method includes providing at least one magnetic field sensor that has a local magnetic field. The local magnetic field of magnetic field sensors is monitored by a controller, such as a microcontroller. When the local magnetic field is altered, a signal indicating the status of the local magnetic field is sent to the controller. The method may further incorporate the step of transmitting a signal from the controller to an electronic device, such as a smart phone as previously described. The method may also include the step of altering the local magnetic field with one or more projectiles and/or a device may be configured to alter the magnetic field by bringing a magnet into close proximity with the sensors. The method may also include the step of indicating a change in a local magnetic field by the sounding of an audible alarm, illuminating a light source, and/or vibrating a portion of the system coupled to a player wearing the sensor.

The system may further comprise networking the magnetic field sensors with a plurality of additional magnetic field sensors such that all of the sensors worn by a particular user are in operable communication with one another. The method may also comprise providing a wearable suit outfitted with a plurality of magnetic field sensors. In an alternative construction, rather than in a wearable suit, the plurality of magnetic field sensors may be incorporated into patches and/or other wearable items such that the players are outfitted with sensors over a desired portion of his or her body. The method may also include the step of providing one or more projectiles and/or devices incorporating a magnet, or device designed to emit electromagnetic radiation, configured to alter the local magnetic field.

Various other features, embodiments, and alternatives of the present invention will be made apparent from the following detailed description, taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Figure 1:
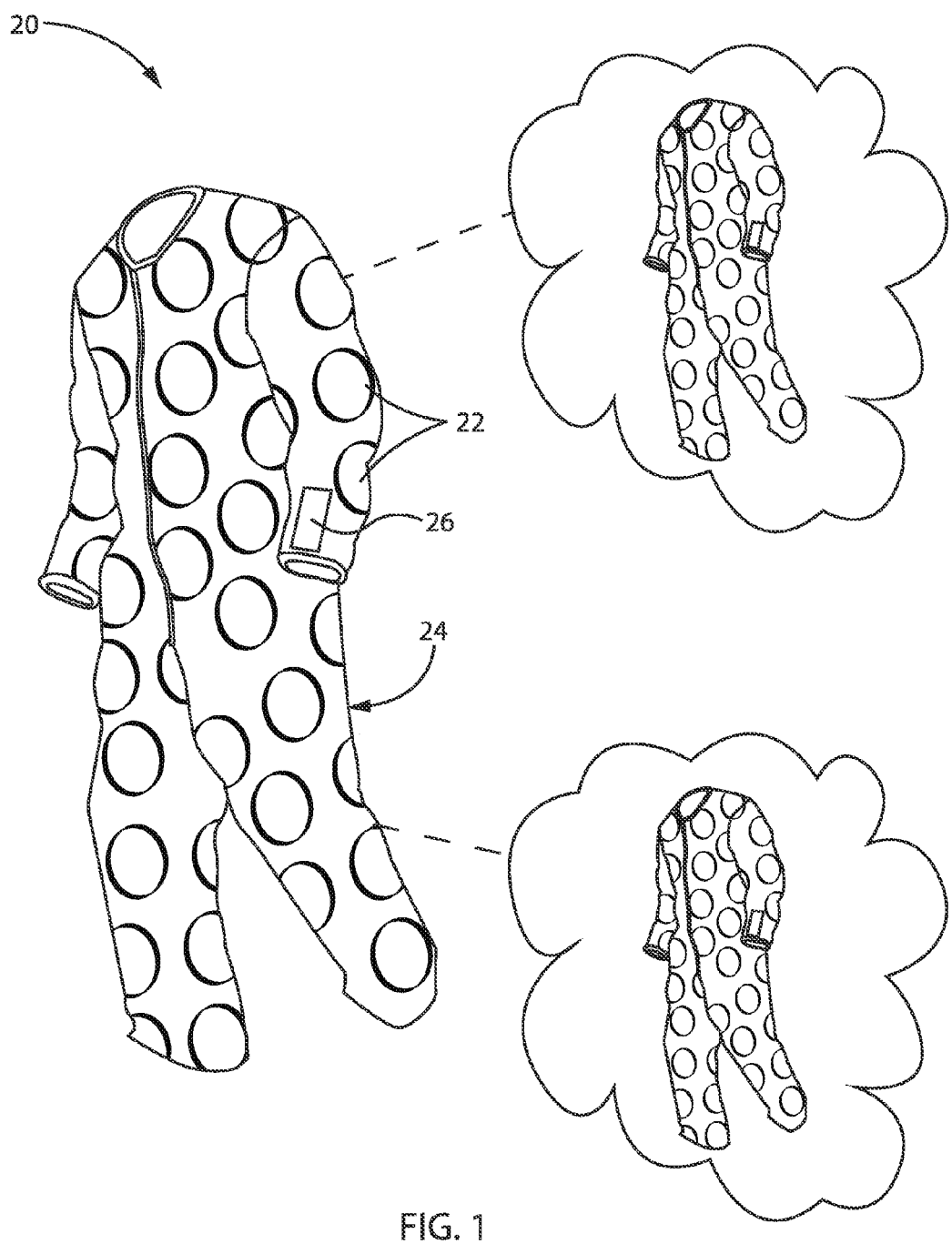
FIG. 1 is a preferred schematic diagram of a suit outfitted with a number of sensors as part of a system according to a preferred embodiment of the invention.

Referring now to the figures, and initially FIG. 1, an exemplary embodiment of a system 20 in accordance with the invention includes a number of sensors 22 operably coupled to a support apparatus, which is shown in the form of a wearable suit 24. Understandably, the support apparatus may include in addition to or alternatively patches, straps, belts, gloves, pads, and the like. The sensors 22 may be in the form of wire coils or hall sensors, for example. In particular, the sensors 22 are configured to detect changes in the local magnetic field. The system 20 may comprise a plurality of suits 24 networked together via a wireless network as will be described herein. The sensors 22 may be in operable communication with an electronic device 26 such as, for example, a smartphone or similar type of device capable of receive communications from the sensors 22 and operating an associated application therefor as will be described in detail herein. The sensors 22 may be spaced from one another about the entirety of the suit 24 in a desired manner to maximize coverage thereof. Alternatively, the sensors may be configured to overlap one another such that the entirety of the suit 24 is covered by at least one of the sensors 22. The sensors 22 may be configured to be networked with respect to one another. In at least one construction of the preferred embodiments, the sensors 22 may be configured to inductively charge the battery provided within the sensor 22, thereby eliminating the need to physically connect to an external power supply.

The suits 24 may be constructed in a number of different configurations in keeping with the preferred embodiments. In particular, the suits 24 may be in the form of a one-piece body covering constructed from a relatively durable and impact-resistant material. Alternatively, the suits 24 may be in the form of a number of patches configured to cover particular body areas. The suits 24 may incorporate head gear configured to cover the participants head and may likewise include sensors 22 configured to communicate with the electronic device 26. The suits 24 may likewise incorporate gloves, shoes, neck coverings, or any other suitable body covering as may be desired.

As illustrated in the exemplary embodiment of FIG. 1, the system 20 includes three suits 24 worn by players of an electronic combat game that will be described herein. Sensors 22 of the suits 24 are in operable communication with one another and with the electronic device 26 such that changes in the local magnetic field are detected by the sensors 22 and transmitted via a wired connection or wirelessly from the sensors 22 to the electronic devices 26. Moreover, the electronic devices 26 are in wireless communication with one another such that the wearer of one suit may be informed of the status of the wearers of the other suits 24. In at least one construction of the present invention, electronic devices 26 are configured to be carried on the user's wrist and/or elsewhere on the user's body and display and track data and vital statistics relating to gameplay. For example, the electronic device 26 may be configured to display the number of active players, the number of total players, and an individual's health status as it pertains to damage inflicted during gameplay, a player's location, other players' locations, and the like. The electronic device 26 may further comprise a graphical user interface of the kind generally known in the art. The electronic device 26 may further include a number of sensors and/or components that may be utilized in practicing the present invention. For example, such electronic devices 26 may include a camera, compass, GPS, Bluetooth, Wi-Fi, RFID, and NFC sensors.

Figure 2:
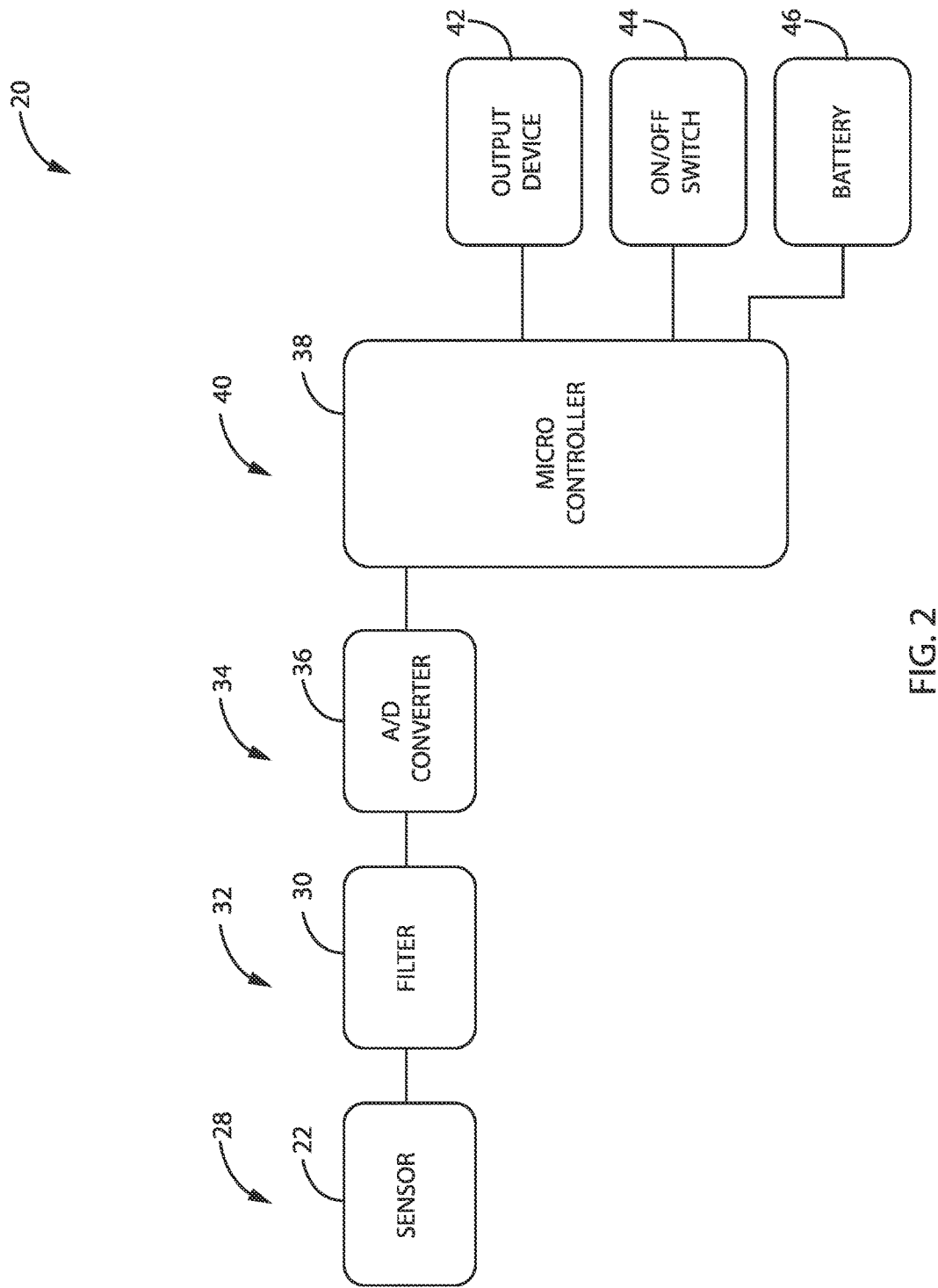
FIG. 2 is a block diagram of a portion of the system of the present invention.

With additional reference now to FIG. 2, a block diagram of the system 20 according to the invention is illustrated. As previously indicated, at least two different methods of detecting a change in the local magnetic field are contemplated in carrying out the preferred embodiments. In particular, the present invention contemplates measuring the voltage induced on a coiled wire or by observing the Hall Effect by utilizing integrated circuits. In the case of the former, i.e., the use of a coiled wire, as the signal produced is analog in nature and the system 20 of the present invention requires a digital signal, additional processing may be necessary. Understandably, the integrated circuits for detecting the Hall Effect may similarly have an analog output that may require additional signal processing.

Accordingly, when a change in the signal is detected by one of the sensors 22 in a first step 28, the analog signal produced thereby may be sent to an analog filter 30 in a second step 32 wherein any noise may be filtered out of the signal. Next, in a third step 34, the signal is converted to a digital signal by comparator 36 as will be described hereinafter. Understandably, any number of alternative methods of converting an analog signal to a digital signal may be utilized such as replacing the comparator 36 with an operational amplifier or the like. Finally, the digital signal is sent to a microcontroller 38 in a fourth step 40. The microcontroller may be in operable communication with an LED, speaker, or other output device 42 to provide a visual, auditory, or tactile signal when the signal detected by the sensors indicates a change to the local magnetic field. In a preferred embodiment, the output device 42 provides both an auditory and visual signal when the magnetic field is triggered. The system 20 may further comprise an on-off switch 44 and the sensors 22 may be operated off of a battery 46 in operable communication with the on-off switch 44. In a preferred construction of the invention, each microcontroller 38 is configured to accommodate a number of sensors 22. Further, a number of microcontrollers 38 may be provided in a networked configuration to thereby increase the sampling rate and minimize the amount of wiring needed to connect the sensors 22 in an operable manner.

Figure 3:
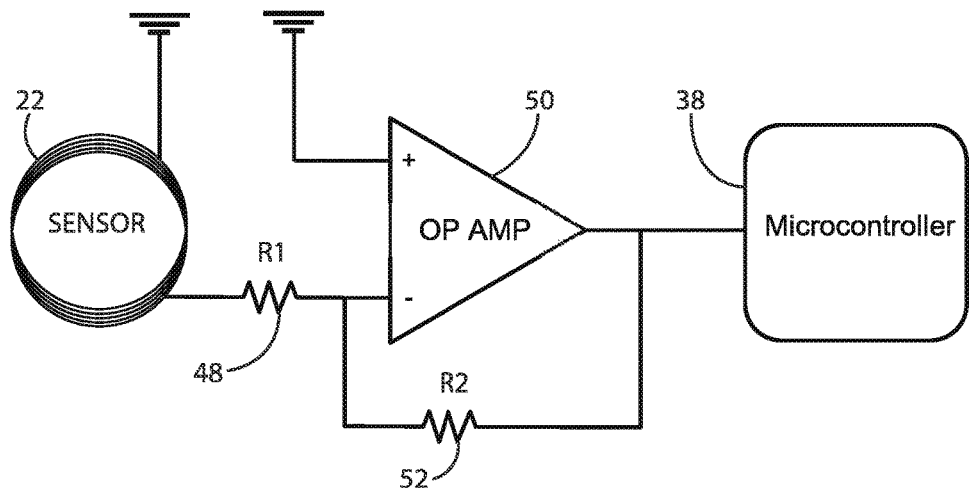
FIG. 3 is a schematic of a portion of the system of FIG. 2.

With reference now to FIG. 3, an electrical schematic of an exemplary embodiment of a sensor 22 of system 20 according to the invention is illustrated. The inductive coil of the sensor 22 is connected in series with a first resistor 48 to the inverting input of an operational amplifier 50. The output of the operational amplifier 50 is coupled to the inverting input through a resistor 52 and connected to an input of the microcontroller 38. The operational amplifier, operated in a high gain negative feedback configuration, transforms any significant voltage differential on the input thereof into a digital signal by driving the output to saturation. In the exemplary embodiment illustrated in FIG. 3, a significant disruption in the magnetic field in the wire coil will cause the output of the operational amplifier 50 to vary such that the microcontroller 38 can detect a deviation of the A/D output that is above a threshold. When the microcontroller 38 receives this signal and processes it via code stored thereon to identify the deviation indicating that the sensor 22 has been triggered, microcontroller 38 may transmit a signal to actuate the output device 42.

Figures 4A, 4B:
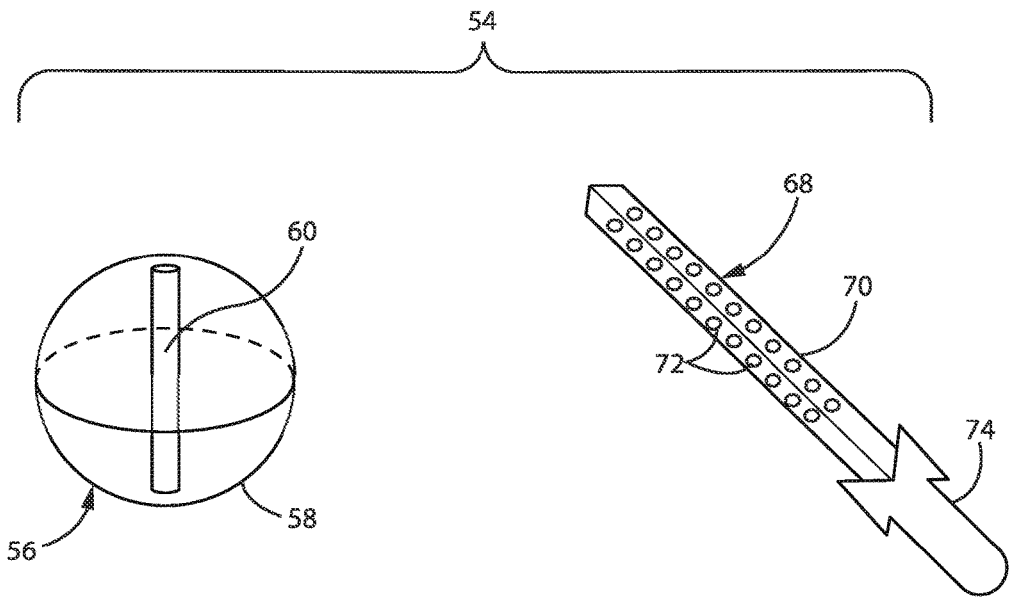
FIG. 4A is a schematic of an exemplary magnetic device for use with the system of the preferred embodiments.
FIG. 4B is a schematic of another exemplary magnetic device for use with the system of the preferred embodiments.
Figure 4C:
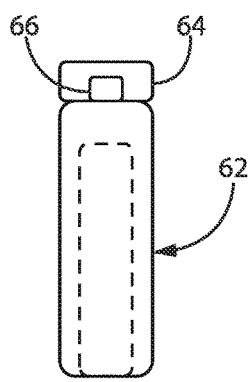
FIG. 4C is a schematic of yet another exemplary magnetic device for use with the system of the preferred embodiments.

With additional reference now to FIGS. 4A-4C, exemplary embodiments of devices 54 for use with the system 20 are illustrated. First, with respect to FIG. 4A, a spherical projectile 56 is illustrated wherein the projectile includes an outer soft covering 58 such as in the form of a polymer or the like and a magnet 60 encased therein. The projectile 56 may be configured to be used by standard paintball or airsoft weapons of the kind generally known in the art. Turning now to FIG. 4B, a second embodiment of a device 54 according to the invention is in the form of a dart-shaped projectile 62. Again, the projectile 62 may have a relatively soft outer covering 64 and a magnet 66 housed therein. In particular, the magnet 66 may be housed within a tip of the projectile 62. Alternatively, device 54 may be an electronic device that is designed to induce a magnetic field. To be of practical use for the intended application, the magnets embedded in the foam projectiles may be shaped, sized and weighted so as to avoid significantly reducing the projectile's trajectory. A standard foam dart has an approximate mass of about 1 g and has a 10 mm diameter. This affects the size, mass, and magnetic field strength of the magnet that can be enclosed within. In general, it is desirable to minimize the mass of the magnets formed from rare-earth elements, based on their expense.

With reference to FIG. 4C a sword-shaped device 68 includes a relatively soft outer covering 70, a number of magnets 72 housed within the covering, and a handle 74 for grasping by the user thereof. The outer covering 70 may be received over a blade-shaped element (not shown) to provide it with structural support, or outer covering 70 may be constructed so as to be relatively self-supporting such that a structural support such as a blade shaped element is not needed. The magnets 72 may be coupled directly to outer covering 70 or may otherwise be coupled to the blade-shaped element and surrounded by outer covering 70. In either case, the magnets 72 are arranged such that outer covering 70 encompasses the magnets 72 to prevent the magnets from exiting the device.

The outer covering 70, as previously indicated, may be constructed from a relatively soft material. The material from which covering 70 is constructed may also be relatively durable to withstand repeated striking of a competitor during gameplay. The material may be durable foam, plastic, or the like. In operation, the sword-shaped device 68 may be used by a player to strike an opposing player to simulate hand-to-hand combat. Other hand-held devices may be utilized as part of the present invention. For example, users may use shields for deflecting blows from the sword-shaped device 68. Further, although the device 68 is illustrated as a sword, it is understood that device 68 may be provided in a multitude of alternative constructions such as, for example, a dagger, a lance, a katana, a mace, etc. In each of the alternative constructions of the sword-shaped device 68, the device includes a relatively soft, yet durable, covering within which a number of magnets 72 are housed for operation with the system of the present invention as will be described in additional detail herein.

Still referring to FIGS. 4A-4C, in operation, each of devices 54 disclosed herein may be used to alter the local magnetic field of one of the sensors 22 of the system 20. In particular, the system 20 is configured such that when one of the magnets of the devices 54 comes into contact with the sensor 22, the local magnetic field is altered such that a signal is sent from the sensor 22 to the operational amplifier 50 and then transmitted along to the microcontroller 38. The microcontroller 38, as previously indicated, is programmed to run a program that communicates with the electronic device 26 of the system 20 to indicate that the sensor 22 has been triggered. In this manner, players of a simulated combat game may automatically be advised of whether their target has been hit or whether they themselves have been hit.

The preferred embodiments also contemplate a method of playing a simulated combat game. In particular, the method comprises the organization of at least two groups of players into opposing teams. Each of the players of each of the teams may be in operable communication with one another via each player's electronic device 26. In this manner, players of each team may be kept abreast of the status of other players on their team. Each of the players of each of the teams may be operating to accomplish a particular goal, such as, for example, capturing the opposition's flag or similar such item as is commonly done in similar games. In a preferred embodiment of the method of the present invention, the flag or similar such item may be in electronic communication with the electronic devices 26 such that when one team captures the opposition's flag, all of the players are notified that the game has ended. As previously indicated, each of the players of each of the teams may be outfitted with a wearable suit 24 of the kind described herein. During gameplay, each of the players may eliminate players of the opposing team by firing projectiles or otherwise contacting the opposing player's suit 24 to alter the local magnetic field as previously described. The game may be configured such that certain areas of a player's suit 24 constitute different types of damage. For example, a player struck in the leg may only lose a certain number of points and may not be entirely eliminated from the game, whereas a player struck in the torso or head may be immediately eliminated from gameplay.

Understandably, the system 20 of the present invention may be modified in any number of alternative manners in keeping with the spirit of the present invention. In one embodiment of the present invention, players may be able to undo damage sustained during gameplay by obtaining objects located throughout the field of play. For example, a player may have sustained damage by being struck in his or her leg and may return his or her status to full health by picking up or otherwise acquiring a token or similar item positioned on the field of play. Such items understandably would be configured to cooperate with the electronic device 26 of the system 20. Any number of alternative, known methods of gameplay may also be incorporated within the scope of the preferred embodiments.

In at least one embodiment of the present invention, the system 20 may incorporate RFID/NFC communication, or any similar such communication protocol. For example, RFID tags may be coupled to a player's suit 24 or elsewhere on his or her body or alternatively embedded into objects and props provided within the gaming environment. Such communication protocols may be used to provide additional features to the gameplay environment. For example, these communication protocols may be utilized to provide users with health power-ups, activation of obstacles and/or equipment, or role-based playing with certain players provided with particular abilities based on his or her communication protocol.

To maximize the function of system 20 with small magnets, the sensors and associated components may be configured to be able to accurately detect even minor changes in the magnetic field. However, such a system may detect changes based on a variety of non-system occurrences; for example, a sensitive detector will pick up interference from the Earth's omnipresent magnetic field. This detection is even more likely when sensors utilize wire coils that have a large area, such as a 100 mm diameter coils, 75 turns each. When a large coil as described rotates in a uniform field, the signal produced may not be distinguishable from an intentional trigger from a magnetized object. Therefore, undesirable false triggers from player movement in the background field can occur.

Adding a secondary sensor system that can detect the force of impact can be used to mitigate false triggers. A pressure sensor or accelerometer embedded in the support apparatus can be employed for this purpose. For this solution to be practical the force of impact must be of sufficient intensity to register; this is problematic for foam projectiles that have small mass and low velocity. Because significant impact intensity is required for such a system, players would also need to wear protective equipment to prevent injury.

Figure 5:
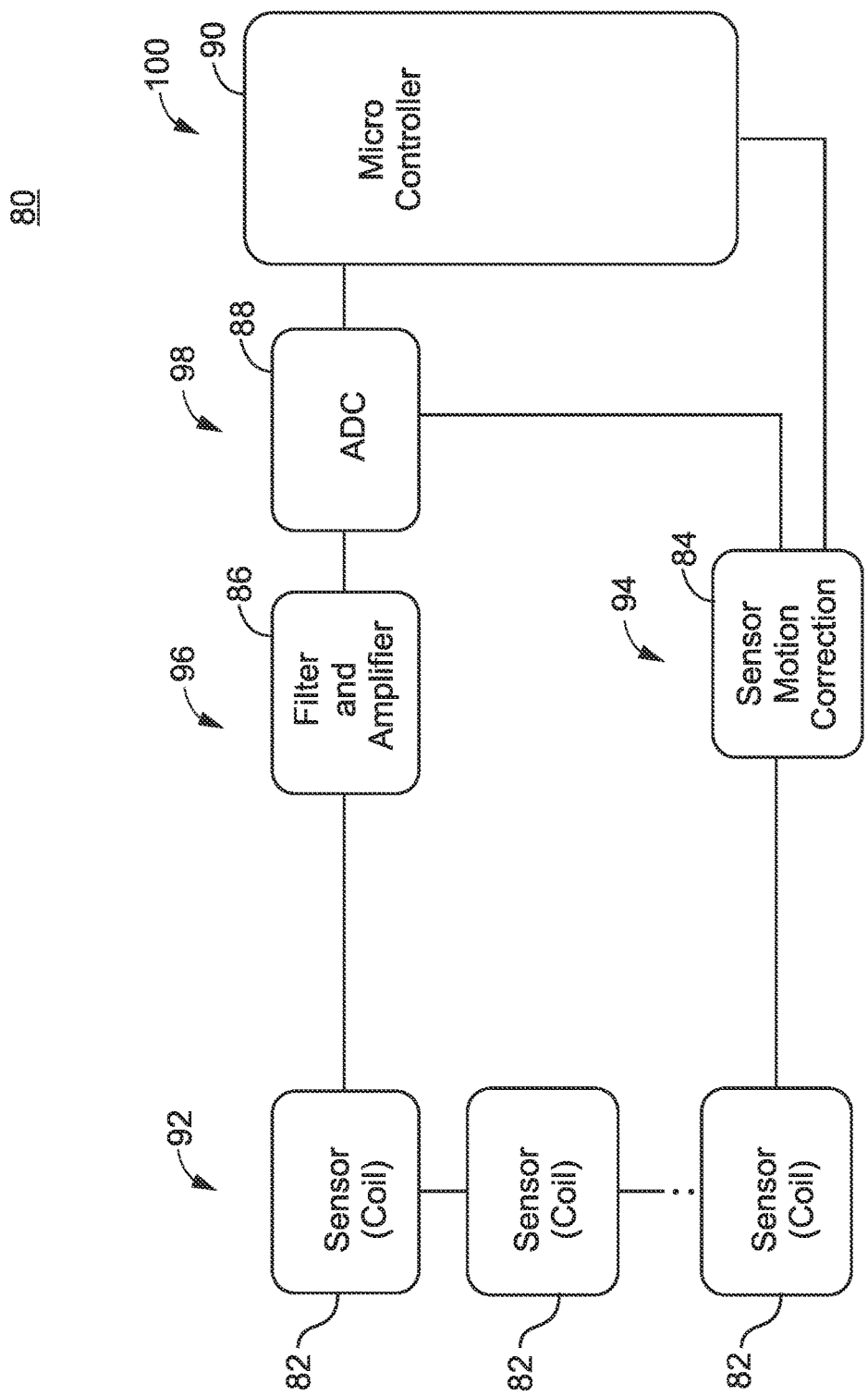
FIG. 5 is a block diagram of a portion of the system of the present invention, according to an alternative embodiment.

Another solution is to use wire coils that have a small area. The interference signal (voltage) generated by a rotating coil in a uniform electric field is given by the formula:

$$V=BAN\omega \sin(\omega t)$$

Where V is the signal voltage on the coil, B is the strength of the background magnetic field, A is the area of the coil, N is the number of turns of the coil, ω is the angular velocity of the coil, and t is time. An illustration of this signal is shown, for example, in FIG. 7, discussed below. By reducing the area and number of turns of the coil, the system will be less sensitive to this type of interference. However, a system with a large array of small coils may increase the expense to manufacture and further requires additional controller circuitry compared a system with a few larger coils, With reference now to FIG. 5, using the signal from two or more individual coils, the background interference can be measured and used to mitigate false triggers. In the broadest from, the system processes the output from two or more non-co-located sensors (coils or Hall effect) to find correlation in the signals that would indicate motion of the sensor system. The correlation detection may be performed using an algorithm in a microcontroller that analyzes incoming signals from different detectors. Alternatively, the mitigation may occur based on an inherent cancellation of the background signal resulting from a special configuration of the coils as described in FIG. 6.

Figure 6:
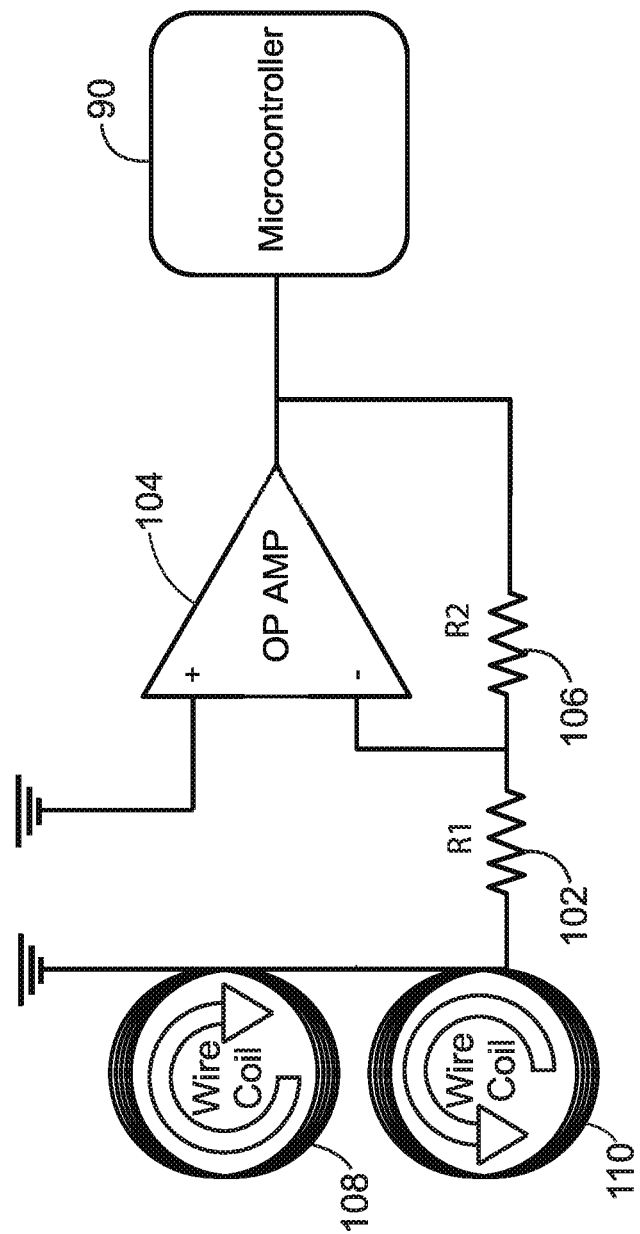
FIG. 6 is a schematic of a portion of the system of FIG. 5.

In the embodiment shown in FIG. 6, two identical coils are connected in series, each with winding direction opposing the other, constrained to the same or adjacent plane, so that their net induced signal (voltage) due to rotation in a uniform magnetic field is zero, or as low as reasonably achievable. In this configuration, the sensor is only sensitive to localized magnetic field disturbances, which achieves the intent of the invention most effectively compared to other embodiments.

Referring again to FIG. 5, a block diagram of a system 80 according to an alternative embodiment of the invention is illustrated. This embodiment of the invention measures the voltage induced on a coiled wire for recognizing hits, producing an analog signal that is then converted to a digital signal, for processing by system 20. This embodiment further addresses the challenge of performing reliable magnetic field detection associated with projectile hits. For example, false alarms may appear if a player moves quickly or as s/he mounts and removes the sensors. Another problem that can arise is the system's sensitivity to interference from the Earth's omnipresent magnetic field. In other words, moving the magnet sensor in the Earth's field can be practically indistinguishable from a projectile hit.

In this embodiment, when a change in the signal is detected by one of the sensors 82 in a first step 92, sensors 82 emit an analog signal, similar to the step described above with reference to FIG. 2. In some instances, the change in the detected signal may be corrected to compensate for rapid motion or rotation of the sensor 82 in an ambient homogeneous field. This can occur during rapid player movement, acceleration due to an impact or collision, motion of the sensor during player dressing, etc. Accordingly, system 80 includes a sensor motion correction system 84 configured to apply the needed correction in a second step 94. Sensor correction system 84 may be implemented using correlated coils having opposing windings as described herein, using software having the microcontroller look at signals from two or more different sensors and search for correlated signals indicating motion of the overall sensor system, and/or using any other method described herein and further may applied at several different points in the magnet detection system.

Following sensor motion correction, the analog signal produced thereby may be further processed, being sent to an analog filter/amplifier 86 in a third step 96 wherein any noise may be filtered out of the signal and the signal amplified. Next, in a fourth step 98, the signal is converted to a digital signal by comparator 88 as will be described hereinafter. Understandably, any number of alternative methods of converting an analog signal to a digital signal may be utilized. Finally, the digital signal is sent to a microcontroller 90 in a fifth step 100. Similar to the embodiment shown and described above with reference to FIG. 2, the microcontroller 90 may be in operable communication with an output device, an on-off switch, and a battery with similar functionality. In a preferred construction of the invention, each microcontroller 90 is configured to accommodate a number of sensors 82. Further, a number of microcontrollers 90 may be provided in a networked configuration to thereby increase the sampling rate and minimize the amount of wiring needed to connect the sensors 82 in an operable manner.

With reference now to FIG. 6, an electrical schematic of an alternative embodiment illustrating sensor 84 within the system 80 is shown. Similar to FIG. 3, the sensor 84 is connected in series with a first resistor 102 to the inverting input of an operational amplifier 104. The output of the operational amplifier 104 is coupled to the inverting input through a resistor 106 and connected to an input of the microcontroller 90. The operational amplifier, operated in a high gain negative feedback configuration, transforms any significant voltage differential on the input into an amplified signal that can be read by the ADC 88, Sensor 84 is shown in further detail, according to the current embodiment. Sensor 84 includes a first induction coil 108 having a first winding direction and a second induction coil 110 having a second winding direction. The first induction coil 108 and second induction coil 110 may be connected in series and placed in a similar or parallel plane. The first indication coil 108 and second induction coil 110 may be identical expect that the first winding direction is opposite to the second winding direction. According to one embodiment, the coils 108, 110 may be located adjacent to each other on a suit 24, while constrained to the same or similar plane. According to another embodiment, the coils 108, 110 may be located in separated locations on a suit 24, such as a coil 108 located in a chest area and a coil located on a back area of the suit 24.

Figure 7:
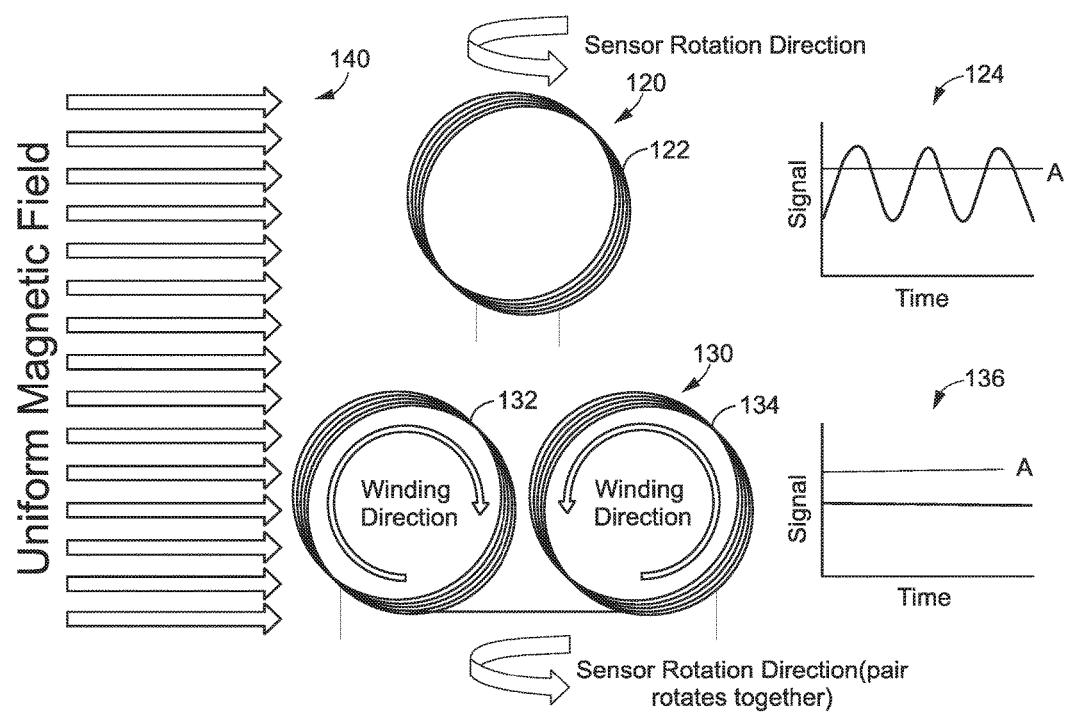
FIG. 7 is a block diagram illustrating the comparative output of sensor embodiments, according to an exemplary embodiment.

Advantageously, using the coil configuration illustrated in FIG. 6 and described herein, magnetic signals from the ambient Earth magnetic field will be cancelled or greatly mitigated. Referring now to FIG. 7, a schematic comparison of sensor types is presented. A first sensor type 120 may be configured using a single coil 122 and a second sensor type 130 may be configured using a first coil 132 having a first winding direction and a second coil 134 having a second winding direction opposite the first winding direction. When the sensor types 120 and 130 are rotated in a uniform magnetic field 140, the first sensor type 120 will generate an oscillating signal over time, as shown in first sensor output graph 124. If the oscillating signal has a sufficient amplitude, e.g., hit threshold "A" in FIG. 7, this oscillating signal induced by the uniform magnetic field could indicate a false hit (indicate a game scoring interaction between the magnetic element (for example, projectile) and the magnetic sensor). The second sensor type 130, in contrast, will generate a relatively constant signal over time, as shown in second sensor output graph 136. As a result, only scoring interaction between the magnetic element and the sensor will sufficiently alter the magnetic field to indicate a gameplay hit, i.e., the chance of detection of a false hit is minimized, thereby improving the quality of gameplay. Further, using the sensor configuration described herein, sensors 84 will be able to detect magnetic interactions using relatively small magnets, such as less than 1 gram, reducing cost and improving safety, design convenience, etc.

In the exemplary embodiment illustrated in FIG. 6, a significant disruption in the magnetic field in the wire coil will cause the output of the operational amplifier 104 to generate an output signal that deviates greater than a threshold amount. The microcontroller 90 then receives this signal and processes it via code stored thereon to indicate that the sensor 84 has been triggered and may transmit a signal to actuate an output device as described herein.

Although the best mode contemplated by the inventors of carrying out the present invention is disclosed above, practice of the present invention is not limited thereto. It will be manifest that various additions, modifications, and rearrangements of the aspects and features of the present invention may be made in addition to those described above, without deviating from the spirit and scope of the underlying inventive concept. The scope of some of these changes is discussed above. The scope of other changes to the described embodiments that fall within the present invention but that are not specifically discussed above will become apparent from the appended claims and other attachments.

I claim:

1. A system for an electronic tag game, the system comprising:
   at least one magnetic field sensor provided on a support apparatus worn by a player of the electronic tag game;
   a controller in operable communication with the at least one magnetic field sensor;
   an electronic device in operable communication with the controller;
   a magnetic projectile device configured to selectively come into contact with the magnetic field sensor, wherein when the magnetic device includes a magnet weighing less than one gram and comes into contact with the magnetic field sensor, a local magnetic field is altered and a signal is sent to the controller to indicate the change in the local magnetic field and wherein the change in the local magnetic field is displayed on the electronic device, wherein the at least one magnetic field sensor comprises a first coil of wire having a first winding direction and a second coil of wire having a second winding direction and the first winding direction and second winding direction are opposite, further wherein the controller is configured to detect an impact of the magnetic projectile device.

2. The system of claim 1, wherein the first coil of wire and the second coil of wire are connected in series.

3. The system of claim 1, wherein the first coil of wire and the second coil are approximately positioned in the same or parallel plane.

4. The system of claim 1, wherein the at least one magnetic field sensor comprises a plurality of networked magnetic field sensors.

5. The system of claim 1, wherein the electronic device is networked with a plurality of additional electronic devices.

6. The system of claim 1, wherein the controller is configured to network the at least one magnetic field sensor with a plurality of additional magnetic field sensors on the support apparatus.

7. The system of claim 1, wherein the electronic device is configured to associate a plurality of the magnetic field sensors with a corresponding plurality of game players, and alerting some or all game players of the status of at least one of the local magnetic fields.

8. The system of claim 7, wherein the plurality of sensors are networked with one another.

9. A method of playing an electronic tag game, the method comprising the steps of:
providing at least one inductive magnetic field sensor on a support apparatus worn by a player of the electronic tag game comprising a first coil of wire having a first winding direction and a second coil of wire having a second winding direction opposite the first winding direction, each coil of wire having a local magnetic field;
monitoring the local magnetic field of the magnetic field sensor to detect an impact of a magnetic projectile device including a magnet weighing less than one gram; and
sending a signal indicating a status of the local magnetic field to a controller.

10. The method of claim 9, further comprising the step of transmitting the signal from the controller to an electronic device.

11. The method of claim 9, further comprising the step of indicating a change in the local magnetic field by one of sounding an audible alarm, illuminating a light source, changing an output of a display of the electronic device, and vibrating.

12. The method of claim 9, further comprising the step of networking the at least one magnetic field sensor with a plurality of additional magnetic field sensors.

13. The method of claim 9, further comprising associating a plurality of the magnetic field sensors with a corresponding plurality of game players, and alerting some or all game players of the status of at least one of the local magnetic fields.

14. The method of claim 9, wherein the support apparatus worn by a player of the electronic tag game comprises a plurality of sensors.

15. The method of claim 14, wherein the plurality of sensors are networked with one another.

16. The method of claim 9, further comprising the step of hitting the at least one magnetic field sensor with a device comprising a magnet, or an electronic device that induces a magnetic field to thereby alter the local magnetic field of the at least one magnetic field sensor.

17. An electronic tag game system comprising:
a support apparatus configured to be worn by a player of the electronic tag game;
a plurality of magnetic field sensors coupled to the suit, each magnetic field sensor including a first coil of wire having a first winding direction and a second coil of wire having a second winding direction and the first winding direction and second winding direction are opposite;
a controller in operable communication with and configured to receive a signal from the network of magnetic field sensors;
a magnetic device, including a magnet weighing less than one gram, configured to alter a local magnetic field of at least one of the magnetic field sensors when positioned in close proximity therewith, such that the signal received by the controller is altered thereby to indicate an impact between the magnetic device and at least one of the magnetic sensors;
wherein the electronic tag game compensates for a uniform magnetic field to minimize detection of a false hit.

18. The system of claim 17, wherein the plurality of magnetic sensors comprises at least one of a group including coils of wire, reed switches, and Hall Effect sensors.

19. The system of claim 17, further including an electronic device configured to associate a plurality of the magnetic field sensors with a corresponding plurality of game players, and alerting some or all game players of the status of at least one of the local magnetic fields.

20. The system of claim 19, wherein the plurality of sensors are networked with one another.

* * * * *